(12) United States Patent
Hosoda

(10) Patent No.: US 11,440,365 B2
(45) Date of Patent: Sep. 13, 2022

(54) STRUT MOUNT

(71) Applicant: Prospira Corporation, Kawasaki (JP)

(72) Inventor: Masaki Hosoda, Tokyo (JP)

(73) Assignee: Prospira Corporation, Kawasaki (JP)

( * ) Notice: Subject to any disclaimer, the term of this patent is extended or adjusted under 35 U.S.C. 154(b) by 244 days.

(21) Appl. No.: 16/634,240

(22) PCT Filed: Aug. 2, 2018

(86) PCT No.: PCT/JP2018/029046
§ 371 (c)(1),
(2) Date: Jan. 27, 2020

(87) PCT Pub. No.: WO2019/031385
PCT Pub. Date: Feb. 14, 2019

(65) Prior Publication Data
US 2020/0276875 A1 Sep. 3, 2020

(30) Foreign Application Priority Data
Aug. 10, 2017 (JP) .............................. JP2017-155549

(51) Int. Cl.
*B60G 13/00* (2006.01)
(52) U.S. Cl.
CPC ...... *B60G 13/003* (2013.01); *B60G 2204/128* (2013.01); *B60G 2204/41* (2013.01); *B60G 2204/45* (2013.01)
(58) Field of Classification Search
CPC .............. B60G 13/003; B60G 2204/45; B60G 2204/41; B60G 2204/128; B60G 13/001
See application file for complete search history.

(56) References Cited

U.S. PATENT DOCUMENTS

| 4,465,296 A | * | 8/1984 | Shiratori | .............. | B60G 15/068 |
| | | | | | 267/221 |
| 4,798,370 A | * | 1/1989 | Inuzuka | ............... | B60G 15/067 |
| | | | | | 267/220 |

(Continued)

FOREIGN PATENT DOCUMENTS

| CN | 1932328 A | 3/2007 |
| DE | 10259093 A1 | 7/2004 |

(Continued)

OTHER PUBLICATIONS

Apr. 8, 2021, search result of the Extended European Search Report issued by the European Patent Office in the corresponding European Patent Application No. 18845016.7.

(Continued)

*Primary Examiner* — Pamela Rodriguez
(74) *Attorney, Agent, or Firm* — Kenja IP Law PC

(57) ABSTRACT

The presently disclosed strut mount (10) attaches the tip end of a strut rod (S) to a vehicle body side panel (P), where the strut mount (10) includes a cylindrical body (11) attached to the strut rod (S), and a cylindrical main body rubber (12) that is fixed to the cylindrical body (11) and is in contact with the vehicle body side panel (P); the main body rubber (12) is provided with a projection (15) extending in the axial direction of the strut rod (S), which is separated from a main body (13) of the main body rubber (12) by a concave portion (12a) and is connected to the main body (13) by a connecting portion (14) that serves as the bottom of the concave portion (12a); and the minimum thickness (a) of the connecting portion (14) is smaller than the radial thickness (b) of the projection (15).

7 Claims, 2 Drawing Sheets

(56) References Cited

U.S. PATENT DOCUMENTS

| | | | | |
|---|---|---|---|---|
| 5,040,775 A | * | 8/1991 | Miyakawa | F16F 13/16 |
| | | | | 267/140.13 |
| 6,588,780 B2 | | 7/2003 | Hayashi et al. | |
| 6,908,076 B2 | * | 6/2005 | Hayashi | F16F 1/3814 |
| | | | | 280/124.155 |
| 2003/0151181 A1 | | 8/2003 | Romer | |
| 2017/0368899 A1 | * | 12/2017 | Hamada | F16F 9/54 |

FOREIGN PATENT DOCUMENTS

| | | |
|---|---|---|
| DE | 102004031553 A1 | 1/2006 |
| DE | 102012210388 A1 | 1/2013 |
| JP | 2004232824 A | 8/2004 |
| JP | 2009228786 A | 10/2009 |
| JP | 2012219913 A | 11/2012 |
| JP | 2014074481 A | 4/2014 |
| JP | 2014206228 A | 10/2014 |
| JP | 2016180425 A | 10/2016 |

OTHER PUBLICATIONS

Feb. 11, 2020, International Preliminary Report on Patentability issued in the International Patent Application No. PCT/JP2018/029046.

Dec. 2, 2020, search result of Office Action issued by the China National Intellectual Property Administration in the corresponding Chinese Patent Application No. 201880051633.1.

Oct. 16, 2018, International Search Report issued in the International Patent Application No. PCT/JP2018/029046.

* cited by examiner

STRUT MOUNT

TECHNICAL FIELD

This disclosure relates to a strut mount.

BACKGROUND

A conventionally known structure for attaching a strut rod to a vehicle body side panel has a vehicle body side panel having a depression, a cylindrical body that has a tapered portion whose diameter increases as it goes downward and that is attached to the strut rod, and a cylindrical rubber body that is fixed to the outer peripheral surface of the cylindrical body and that has a mating junction mated with the depression (see JP 2014-74481 A (PTL 1)). In this strut rod attaching structure, a strut mount is disposed between the strut rod and the vehicle body side panel by mating the mating junction of the rubber body with the depression of the vehicle body side panel.

The conventional strut mount has a structure in which a cylindrical body formed of, for example, a steel plate is included, a rubber body is fixed over the entire circumference of the outer peripheral surface of the cylindrical body, and a part of the rubber body is also fixed to the inner peripheral surface thereof. In other words, the conventional strut mount has a structure in which a cylindrical body is embedded inside a rubber body by, for example, insert molding. In order to prevent water, dust or the like from entering the inner diameter side of the rubber body, the rubber body is provided with a rubber projection on the upper extension of the cylindrical body, and the rubber projection is in close contact with a rebound stopper metal fitting that is fixed to the tip end side of the strut rod. When water, dust or the like enters the inner diameter side of the rubber body, the strut rod, tightening nut or the like may rust. When rusting occurs, the tightening nut may be loosened or broken, for example.

CITATION LIST

Patent Literature

PTL 1: JP 2014-74481 A

SUMMARY

Technical Problem

However, in the conventional strut mount, the rubber projection is integrally connected to the rubber body, so that the rubber projection fluctuates in conjunction with the main body rubber.

It could thus be helpful to provide a strut mount where a rubber projection for preventing water, dust or the like from entering the inner diameter side of a main body rubber is included and the rubber projection does not fluctuate in conjunction with the main body rubber.

Solution to Problem

The strut mount of the present disclosure is a strut mount that attaches and supports a tip end of a strut rod of a strut suspension provided on a vehicle to a vehicle body side panel of the vehicle, where the strut mount includes a cylindrical body attached to the strut rod, and a cylindrical main body rubber that is fixed to an outer peripheral surface of the cylindrical body and is in contact with the vehicle body side panel; the main body rubber is provided with a projection extending in an axial direction of the strut rod, where the projection is separated from a main body of the main body rubber by a concave portion, and is connected to the main body by a connecting portion that serves as a bottom of the concave portion; and a minimum thickness of the connecting portion is smaller than a radial thickness of the projection.

Advantageous Effect

According to the present disclosure, it is possible to provide a strut mount where a rubber projection for preventing water, dust or the like from entering the inner diameter side of a main body rubber is included and the rubber projection does not fluctuate in conjunction with the main body rubber.

DETAILED DESCRIPTION

An embodiment of the present disclosure is described below with reference to the drawings.

Figure 1:
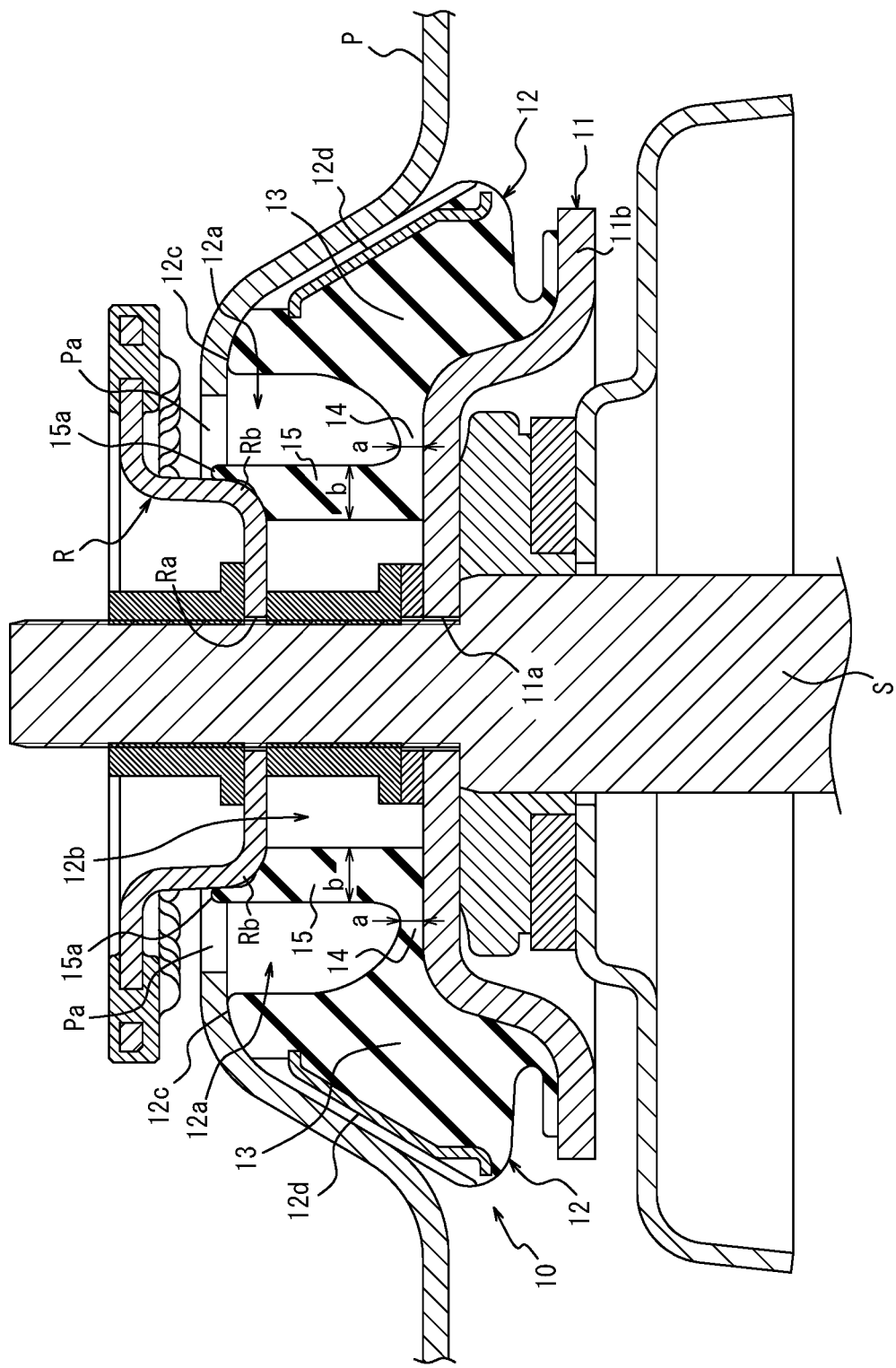
FIG. 1 is a cross-sectional view along the direction of a strut rod, which illustrates a strut mount of an embodiment of the present disclosure mounted on a vehicle body side panel.
Figure 2:
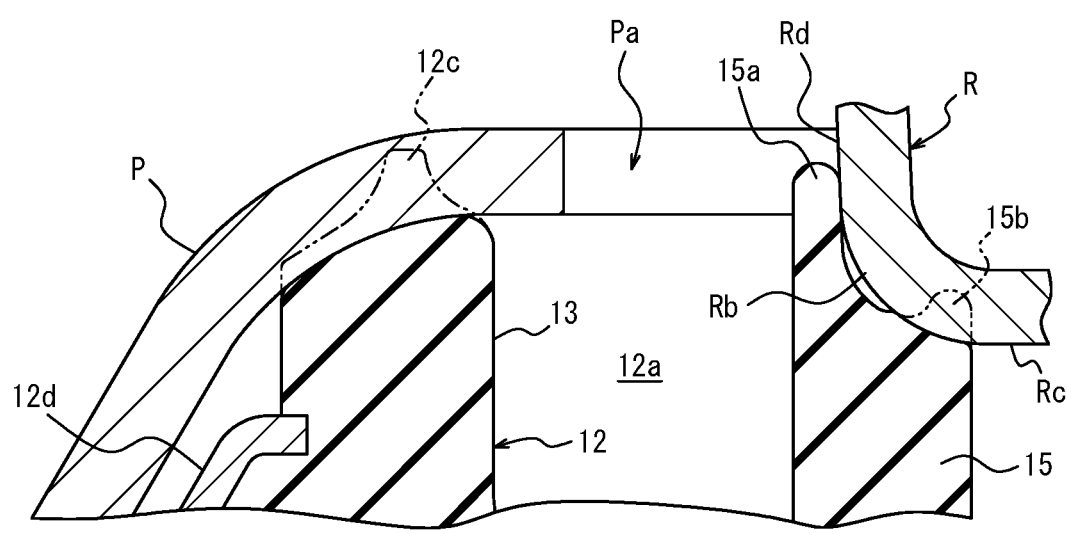
FIG. 2 is a cross-sectional view like FIG. 1, which illustrates an enlarged view of the periphery of the projection provided on the main body rubber of FIG. 1.

As illustrated in FIGS. 1 and 2, the strut mount 10 of the present embodiment is used to attach and support a tip end of a strut rod S of a strut suspension provided in a vehicle such as an automobile (not illustrated in the drawings), that is, a tip end of a piston rod of a shock absorber constituting the strut suspension, to a vehicle body side panel P constituting the vehicle.

The strut mount 10 of the present embodiment includes a cylindrical body 11 attached to the strut rod S of the strut suspension, and a cylindrical main body rubber 12 that is fixed to the outer peripheral surface of the cylindrical body 11 and is in contact with the vehicle body side panel P, where the main body rubber 12 is provided with a projection (rubber projection) 15 extending in the axial direction of the strut rod S, the projection 15 is separated from a main body 13 of the main body rubber 12 by a concave portion 12a and is connected to the main body 13 by a connecting portion 14 which is the bottom of the concave portion 12a, and the minimum thickness a of the connecting portion 14 is smaller than the radial thickness b of the projection 15.

In the present embodiment, a rebound stopper metal fitting R is attached to the tip end side of the strut rod S to which the cylindrical body 11 is attached, where the rebound stopper metal fitting R is at a distance above the cylindrical body 11 (see FIG. 1). The rebound stopper metal fitting R is formed in a substantially disk-like shape by, for example, a metal material, has a central axis opening Ra and a concave portion Rb that is one step down from the peripheral portion at the central portion around the central axis opening Ra, and is fixed to the strut rod S that passes through the central axis opening Ra.

The cylindrical body 11 of the present embodiment is formed in a substantially disk-like shape by, for example, a metal material, has a central axis opening 11a and an outward flange-shaped peripheral portion 11b that is one step down from the central portion, and is fixed to the strut rod S that passes through the central axis opening 11a.

The main body rubber 12 of the present embodiment is located concentrically with a central axis space 12b through which the strut rod S passes. In addition, the main body rubber 12 has a main body 13 and a projection 15 with a groove-like concave portion 12a opening to an upper surface 12c interposed therebetween. Further, the main body rubber 12 is formed in a substantially cylindrical shape, where the diameter increases as it goes downward, and the outer peripheral surface is a downward inclined surface. Furthermore, the main body rubber 12 has a metal member 12d that is partially exposed to the outer peripheral surface and is embedded in the vicinity of the outer peripheral surface, such as a belt-shaped metal member extending over the entire outer peripheral surface (see FIG. 1). The substantially upper half portion of the main body rubber 12 in the up-down direction is formed as a mating junction, and the outer shape of the mating junction substantially matches the shape of a depression provided in the surrounding area of an opening Pa opened in the vehicle body side panel P, so that the mating junction can be integrally mated with the depression (see FIG. 1). In addition, the upper surface 12c of the main body rubber 12 is formed in a substantially chevron shape protruding upward where the radial width decreases as it goes upward (see FIG. 2).

In the present embodiment, the inner peripheral surface of the main body 13 of the main body rubber 12 is integrally connected to the outer peripheral surface of the projection 15 via the connecting portion 14 (see FIG. 1), and the minimum thickness a of the connecting portion 14 is smaller than the radial thickness b of the projection 15. As used herein, the minimum thickness a of the connecting portion 14 refers to the thickness in the up-down direction of the thinnest part of the connecting portion 14 in the present embodiment, and the radial thickness b of the projection 15 is the average thickness in the radial direction of the projection 15 in the present embodiment.

In the present embodiment, the minimum thickness a of the connecting portion 14 is 4 mm or less, preferably 1.5 mm to 3 mm.

For the strut mount 10 of the present embodiment, when the minimum thickness a of the connecting portion 14 is smaller than the radial thickness b of the projection 15, the rubber thickness of the connecting portion of the main body rubber 12 to the projection 15 is the smallest in the whole main body rubber 12, In this way, it is possible to suppress the fluctuation generated in the main body rubber 12 from being transmitted to the projection 15 via the connecting portion 14. When the minimum thickness a is 4 mm or less, it is possible to effectively suppress the fluctuation of the main body rubber 12 from being transmitted to the projection 15. When the minimum thickness a is 1.5 mm to 3 mm, it is possible to more reliably suppress the transmitting of fluctuation.

When the thickness of the connecting portion 14 connecting the main body rubber 12 and the projection 15 is large, the projection 15 fluctuates as the main body rubber 12 fluctuates. However, in the strut mount 10 of the present embodiment, this does not happen because the fluctuation generated in the main body rubber 12 is suppressed from being transmitted to the projection 15 via the connection portion. Therefore, the case where the projection 15 is pulled and falls and it is impossible to provide a close contact or a seal to the rebound stopper metal fitting R, for example, does not happen to the strut mount 10 of the present embodiment.

In the present embodiment, the tip end of the projection 15 of the main body rubber 12 is in contact with a bent portion Rb of the rebound stopper metal fitting R attached to the strut rod S above the cylindrical body 11. This structure can suppress the projection 15 from falling inward. The bent portion Rb of the rebound stopper metal fitting R has a bottom surface Rc and a rising surface Rd that is bent at a substantially right angle and then rise following the bottom surface Rc (see FIG. 2).

The projection 15 of the present embodiment extends in the axial direction of the strut rod S, so that the outer surface in the radial direction (outer peripheral surface) of the projection 15, which is continuous with the inner peripheral surface of the main body 13, is positioned radially outside the rising surface Rd of the rebound stopper metal fitting R (see FIGS. 1 and 2).

As illustrated in FIG. 2, in the present embodiment, the tip end of the projection 15 is formed in a bifurcated shape having a first contact portion 15a in contact with the rising surface Rd side of the bent portion Rb and a second contact portion 15b in contact with the bottom surface Rc side of the bent portion Rb. This structure can reliably suppress the projection 15 from falling inward.

The first contact portion 15a of the present embodiment is formed in a ridge shape having substantially the same width in the radial direction and in the height direction so that the radially outside portion of the projection 15 is extended upward (see FIG. 2). The first contact portion 15a is positioned so as to cover the rising surface Rd side from the outside in the radial direction when the tip end of the projection 15 is in contact with the bent portion Rb of the rebound stopper metal fitting R, and the first contact portion 15a is in contact with the rising surface Rd side (see FIG. 2).

The second contact portion 15b of the present embodiment is formed by protruding the radially inside portion of the projection 15 in a substantially chevron shape (see FIG. 2). When the tip end of the projection 15 is in contact with the bent portion Rb of the rebound stopper metal fitting R, the second contact portion 15b is in contact with the bottom surface Rc side so that the second contact portion 15b is pressed and crushed against the bottom surface Rc side (see FIG. 2).

The outer surface between the first contact portion 15a and the second contact portion 15b of the present embodiment is formed by a curved surface having a curvature smaller than the curvature of the outer surface of the bent portion Rb of the rebound stopper metal fitting R. That is, the curve drawn by the curved surface between the first contact portion 15a and the second contact portion 15b is steeper than the outer surface of the bent portion Rb (see FIGS. 1 and 2). This structure can closely adhere the projection 15 to the bent portion Rb and more reliably suppress the projection 15 from falling inward.

The following describes an usage example of the strut mount 10 of the present embodiment. The strut mount 10 of the present embodiment is used for attaching and supporting the tip end of a strut rod S of a strut suspension provided in a vehicle such as an automobile (not illustrated in the drawings) to a vehicle body side panel P constituting the vehicle (see FIG. 1).

First, the strut rod S is passed through the central axis opening 11a of the cylindrical body 11 of the strut mount 10 of the present embodiment and the cylindrical body 11 is fixed to the strut rod S, and then the tip end of the strut rod S is projected from below the vehicle body side panel P to above the vehicle body side panel P passing through the opening Pa. At this time, the main body rubber 12 of the strut mount 10 of the present embodiment is in a state where the strut rod S passes through the central axis space 12b, the mating junction of the substantially upper half portion in the up-down direction is integrally mated with the depression in the surrounding area of the opening Pa of the vehicle body side panel P (see FIG. 1), and the upper surface 12c of the main body rubber 12 is in contact with and crushed against the inner surface of the depression of the vehicle body side panel P (see FIG. 2). The strut mount 10 is disposed between the strut rod S and the vehicle body side panel P by mating the mating junction of the main body rubber 12 of the strut mount 10 of the present embodiment with the depression of the vehicle body side panel P (see FIG. 1).

Next, the rebound stopper metal fitting R is mounted on the strut rod S above the vehicle body side panel P so that the tip end of the strut rod S protruding above the vehicle body side panel P from the opening Pa passes through the central axis opening Ra (see FIG. 1). The rebound stopper metal fitting R mounted on the strut rod S is fixed to the strut rod S so that the bent portion Rb gets into the opening Pa of the vehicle body side panel P.

In the present embodiment, when the rebound stopper metal fitting R is fixed to the strut rod S, the strut mount 10 is in contact with the bent portion Rb where the bent portion Rb is pressed against the tip end of the projection 15 of the main body rubber 12. In addition, because the outer surface between the first contact portion 15a and the second contact portion 15b is formed by a curved surface having a curvature smaller than the curvature of the outer surface of the bent portion Rb of the rebound stopper metal fitting R, the first contact portion 15a and the second contact portion 15b are pressed and expanded by the bent portion Rb and are pressed against and in close contact with the bottom surface Rc side and the rising surface Rd side (see FIG. 2). That is, the first contact portion 15a of the projection 15 is positioned so as to cover the rising surface Rd side of the bent portion Rb from the outside in the radial direction, and the second contact portion 15b is in close contact with the bottom surface Rc side where the second contact portion 15b is pressed and crushed against the bottom surface Rc side of the bent portion Rb (see FIG. 2).

In the strut mount 10 of the present embodiment, the rubber thickness of the connecting portion of the main body rubber 12 to the projection 15 is the smallest in the whole main body rubber 12, rendering it possible to suppress the fluctuation generated in the main body rubber 12 from being transmitted to the projection 15 via the connecting portion. As a result, the deterioration of vibration isolating performance can be suppressed even if no metallic (for example, steel plate) cylindrical body serving as a core or the like is embedded inside the main body rubber 12.

In addition, in the strut mount 10 of the present embodiment, the strut mount 10 is disposed between the strut rod S and the vehicle body side panel P, and even if the groove-like concave portion 12a of the main body rubber 12 communicates with the opening Pa of the vehicle body side panel P (see FIG. 1), the tip end of the projection 15 can provide a seal to the rebound stopper metal fitting R to prevent water, dust or the like from entering the inner diameter side of the main body rubber 12. When water, dust or the like enters, for example, the strut rod S located in the central axis space 12b may rust. However, this does not happen in the present embodiment.

Further, in the strut mount 10 of the present embodiment, the outer surface in the radial direction (outer peripheral surface) of the projection 15 is positioned on the outside of the rising surface Rd of the bent portion Rb of the rebound stopper metal fitting R in the radial direction. Therefore, the projection 15 does not fall inward in the radial direction even if the projection 15 is pressed by the rebound stopper metal fitting R from above. As a result, unlike conventional strut mounts, it is unnecessary to embed a metallic (for example, steel plate) cylindrical body serving as a core inside the rubber body to increase the rubber rigidity of the portion that is in close contact with the rebound stopper metal fitting.

In other words, the strut mount 10 of the present embodiment does not have a metallic (for example, steel plate) cylindrical body serving as a core or the like embedded in the main body rubber 12 to improve the rubber rigidity of the portion that is in close contact with the rebound stopper metal fitting R. Accordingly, there is no metallic member to increase the weight, and the production of the strut mount does not need to include a process of forming a core portion of a metallic cylindrical body, which reduces the processing steps. Therefore, the strut mount 10 of the present embodiment has a structure which can prevent water, dust or the like from entering the inner diameter side of the main body rubber 12, and at the same time, the strut mount 10 can improve the processability during production without causing increase in weight.

In the present embodiment, the main body rubber 12 of the strut mount 10 is in direct contact with the vehicle body side panel P. However, the strut mount 10 itself may be provided with an attaching plate that is in contact with the main body rubber 12, and then the strut mount 10 may be attached to the vehicle body side panel P via the attaching plate.

REFERENCE SIGNS LIST 10 strut mount
11 cylindrical body
11a central axis opening
11b peripheral portion
12 main body rubber
12a concave portion
12b central axis space
12c upper surface
12d metal member
13 main body
14 connecting portion
15 projection
15a first contact portion
15b second contact portion
P vehicle body side panel
Pa opening
R rebound stopper metal fitting
Ra central axis opening
Rb bent portion
Rc bottom surface
Rd rising surface
S strut rod
a minimum thickness
b radial thickness

The invention claimed is:

1. A strut mount that attaches and supports a tip end of a strut rod of a strut suspension provided on a vehicle to a vehicle body side panel of the vehicle, wherein
the strut mount comprises a cylindrical body attached to the strut rod, and a cylindrical main body rubber that is fixed to an outer peripheral surface of the cylindrical body and is in contact with the vehicle body side panel, the main body rubber is provided with a projection extending in an axial direction of the strut rod, where the projection is separated from a main body of the main body rubber by a concave portion, and is connected to the main body by a connecting portion that serves as a bottom of the concave portion, a minimum thickness of the connecting portion is smaller than a radial thickness of the project, a tip end of the projection of the cylindrical main body rubber is constantly in contact with a bent portion of a rebound stopper metal fitting over an entire circumference of the projection, the rebound stopper metal fitting being fixed to the strut rod above the cylindrical body.

2. The strut mount according to claim 1, wherein the tip end of the projection is formed in a bifurcated shape having a first contact portion in contact with a rising surface side of the bent portion and a second contact portion in contact with a bottom surface side of the bent portion.

3. The strut mount according to claim 2, wherein an outer surface between the first contact portion and the second contact portion is formed by a curved surface having a curvature smaller than a curvature of an outer surface of the bent portion.

4. The strut mount according to claim 3, wherein the first contact portion and the second contact portion are pressed and expanded by the bent portion which is interposed between the first contact portion and the second contact portion.

5. The strut mount according to claim 2, wherein the bent portion of the rebound stopper metal fitting has a bottom surface and a rising surface which is bent at a substantially right angle and then rise following the bottom surface, wherein the first contact portion is formed in a ridge shape and extends upward in the axial direction of the strut rod, wherein the second contact portion is located radially inside of the first contact portion and is formed by protruding upward in the axial direction of the strut rod, and wherein the tip end of the projection is in contact with the bent portion in such a manner that the first contact portion is in contact with the rising surface and the second contact portion is pressed by the bottom surface from above.

6. The strut mount according to claim 5, wherein the first contact portion and the second contact portion are pressed and expanded by the bent portion which is interposed between the first contact portion and the second contact portion.

7. The strut mount according to claim 2, wherein the first contact portion and the second contact portion are pressed and expanded by the bent portion which is interposed between the first contact portion and the second contact portion.

* * * * *